Fig. 3

United States Patent Office 3,011,873
Patented Dec. 5, 1961

3,011,873
MEASUREMENT AND CONTROL OF CONSTITUENT POTENTIALS
Raymond L. Davis II, Newtown Square, Pa., assignor to Leeds and Northrup Company, Philadelphia, Pa., a corporation of Pennsylvania
Filed Jan. 30, 1959, Ser. No. 790,123
28 Claims. (Cl. 23—232)

This invention relates to methods of, and apparatus for, measuring and controlling the constituent potential of gaseous atmospheres, more particularly to the determination and control of the constituent potential with respect to work undergoing treatment by a treating atmosphere such as in carburizing or nitriding of metals, and has for an object the provision of a method of, and apparatus for, protecting at all times, and for calibrating as desired, a sensitive element having a characteristic which changes with change in the constituent potential.

The present invention is particularly useful in connection with methods and apparatus of the type disclosed in my Patent 2,698,222, dated December 28, 1954. In that patent there is set forth the manner in which a sensitive element comprising a filamentary ferrous metal alloy responds by change of resistance to change in the constituent potential of a furnace atmosphere and how the resistance characteristic of the sensitive element may be reduced to a reproducible minimum level. In the past, the reproducible minimum resistance has been achieved by maintaining about the sensitive element an atmosphere of air which through the operation of a complex carbon-monoxide, carbon-dioxide system gives rise to a decarburizing action on the sensitive element. While in my said patent reference was made to the use of a carbon removing atmosphere comprising hydrogen and some water vapor, that method has not been utilized to any substantial extent because of the danger inherent in having present in steel plants and the like storage containers of hydrogen, the hydrogen being stored therein under high pressure.

In accordance with the present invention, it has been found that there are a number of advantages of the hydrogen system over the CO, $CO_2$ system of decarburizing the constituent-sensitive element. As hydrogen and a small percentage of oxygen are added, say to a carburizing atmosphere surrounding the sensitive element, carbon is gradually removed from the sensitive element until on the carbon scale utilized, the apparent carbon remaining in the element reaches a value of —0.05% C. This low negative value of carbon is a reproducible value which permits standardization of the measuring circuit for sensitive elements having differing absolute values of resistance. When the "—0.05% C" concentration has been attained, the resistance of such sensitive element will not further change during continued exposure to the carbon-removing atmosphere at constant temperature. This is in contrast with the CO, $CO_2$ system where, as I explained in my patent, there is eventually a rise in the resistance of the sensitive element due to oxidation of the filament.

Further in accordance with the present invention, there is utilized a nitriding agent for the source of the decarburizing and protective atmosphere for the sensitive element. More particularly, ammonia is passed over a catalyst maintained at high temperature and for a time interval adequate to dissociate the ammonia into its constituent gases, nitrogen and hydrogen. The dissociated ammonia is then passed through an ammonia scavenger or absorber for removal of any remanent traces of undissociated ammonia. The nitrogen and hydrogen gases, both in their molecular form, are then passed into a vessel enclosing the sensitive element where they are utilized for a number of purposes. As will later be explained, they are effective to protect the sensitive element from deposition thereon of carbon and other deleterious material. The hydrogen in combining with oxygen to form water vapor is effective in removing carbon not only from the sensitive element for calibration purposes but also when present as the result of sooting conditions. The effectiveness of the atmosphere in the foregoing respect is further enhanced by the addition thereto of a minor proportion of air used during the calibrating operations.

Further in accordance with the invention, the constituent potential of a heat-treating furnace is measured and controlled by a sensitive element located externally of that furnace, but in an atmosphere which to a close approximation is the same as that of the heat-treating furnace, and whose temperature, and that of the sensitive element, is maintained above a critical value and in known predetermined relation to that of the treating furnace.

As applied to carburizing furnaces, it has been found that if certain conditions are satisfied, a continuously withdrawn sample of the carburizing atmosphere within the furnace may be utilized in a separate measuring assembly for determination of the carbon potential of the furnace atmosphere. First, the sample of the carburizing atmosphere withdrawn from the carburizing furnace must be rapidly cooled to below a critical temperature within the range of from 1,000° F. to 1,200° F. Such sample when rapidly cooled, as by flowing the same through an air-cooled line, retains its carbon content. If withdrawn within the range of from 1,000° F. to 1,200° F., carbon will be precipitated, that is, there will be a dropping out of carbon from the carburizing atmosphere, in the form of lamp black and the like which will not only clog the flow lines but will, of course, greatly change the carbon potential of the sample delivered to the measuring assembly.

After the rapid cooling of the hot sample from the carburizing furnace, it is filtered to remove sulphur-bearing gases and other contaminants which adversely affect the carbon potential measurement. The advantages achieved by the removal of the sulphur-bearing gases and other impurities which adversely affect the precision of measurement are obvious. While the measurement of carbon potential with the reaction products in their nascent state achieves highest precision, it has been found that if the foregoing conditions be met, the system of the present invention provides a measurement of constituent potentials with an adequate degree of precision to meet commercial requirements.

As will be later pointed out, the provision of a protective atmosphere for the sensitive element and the procedures for calibrating that element are common to all modifications of the invention.

For further objects and advantages of the invention arising in connection with different applications of the invention, reference is to be had to the following detailed description taken in conjunction with the accompanying drawings, in which.

Figure 1:
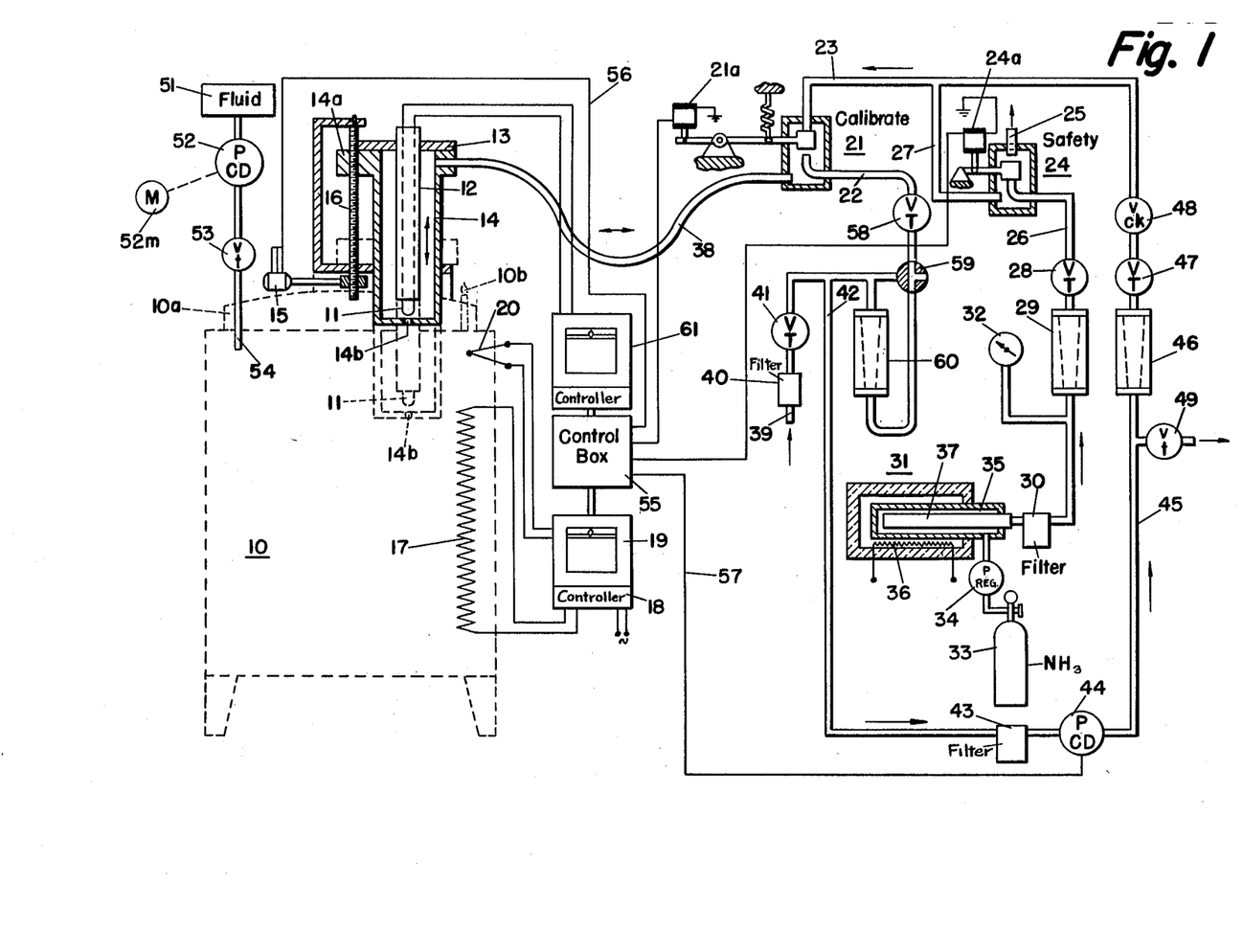
FIG. 1 diagrammatically illustrates one embodiment of the invention.

Referring to FIG. 1, the invention in one form has been illustrated as applied to a metal-treating furnace 10 which may be utilized either for nitriding or carburizing metals. The furnace itself may be of any one of a number of types, the one illustrated in outline form being of the type illustrated in Patent 2,541,857, issued jointly to me and to Wayne L. Besselman. A constituent-sensitive element 11 extends in exposed relation to the surrounding atmosphere. The element 11 is supported from a tube 12 protruding from an upper plate 13 into a vessel 14 bodily movable from its withdrawn full-line position to its broken-line position within the interior of furnace 10. The vessel 14 can be raised to and lowered from its illustrated position by energization of a motor 15 driving a threaded member 16. This member 16 is threaded through a projection 14a of vessel 14.

Figure 2:
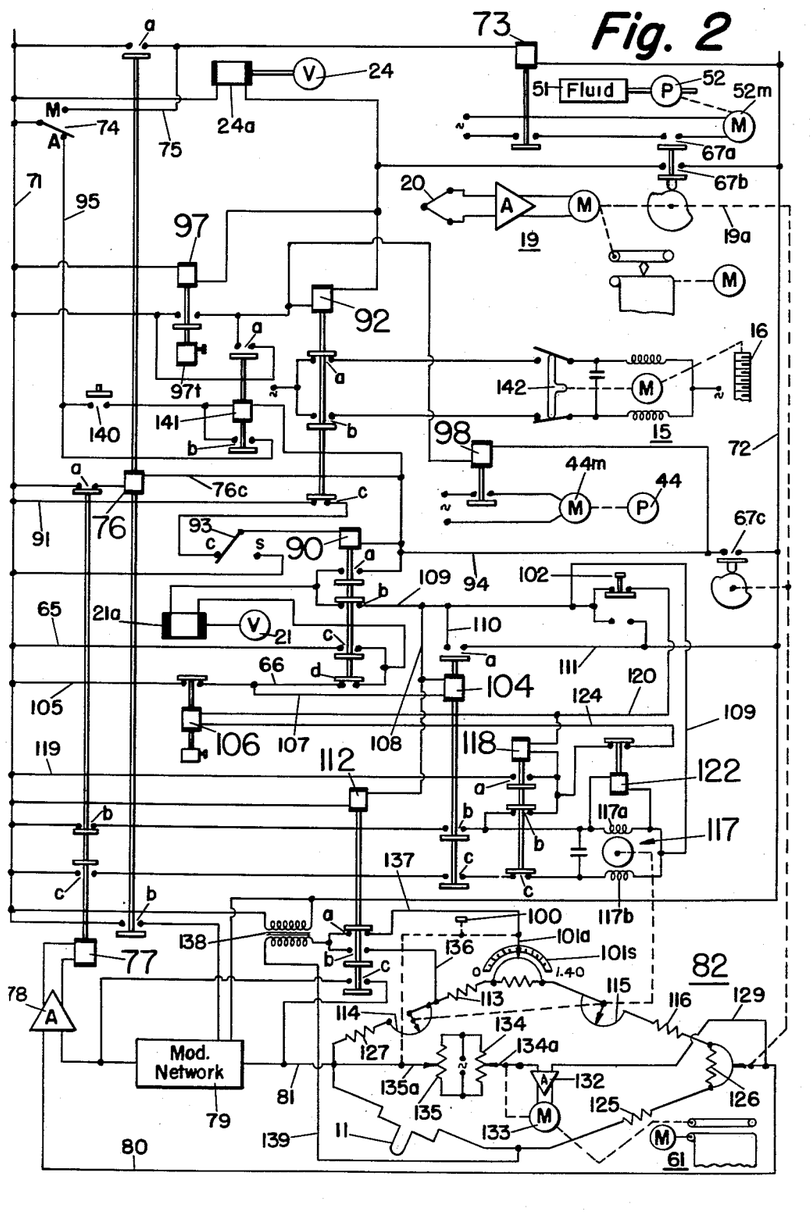
FIG. 2 is a wiring diagram of the system of FIG. 1.

The manner in which the motor 15 and the other components of the system illustrated in FIG. 1 are controlled will be later set forth in detail in connection with FIG. 2. Accordingly, the operations as shown in FIG. 1 will be described with the assumption that the control features of FIG. 2 are present and adequate to perform the several assumed functions therefor.

Assuming that the furnace 10 is being brought into operation for the treatment of work, heating coils illustrated by a resistor 17 will be energized from a suitable source of supply and under the control of suitable regulating equipment such as illustrated in block form by the controller 18. This controller is shown in association with an indicating-recording instrument 19 which in response to a thermocouple 20 continuously indicates and records the temperature of furnace 10. During the initial warm-up period of the furnace, the sensitive element 11 in the solid-line position is disposed in an atmosphere of air at relatively low temperature. As soon, however, as the temperature of furnace 10 rises to a point, 1,200° F. for example, where there is need to protect element 11 from contamination, a solenoid valve 21 is energized to close a flow-line 22 and to open a flow-line 23. At the same time a solenoid-operated safety valve 24 is energized to close a flow-line 25 and to open a flow-line 26. In this connection, it is to be noted that whenever the temperature of furnace 10 drops to or below about 1,200° F., the valves 21 and 24 are deenergized, and they then assume their illustrated positions. In their illustrated deenergized positions, the flow-line 26 is not only closed, but any leakage which might occur at valve 24 is made harmless by the flow-line 25 which vents the valve body to a safe location, generally to the exterior of the metal-treating shop.

With the valves 21 and 24 in their energized positions a branch flow-line 27 will, through valve 24, be flow-connected with the flow-line 26 in which there is present a throttling valve 28, a flow meter 29 and an ammonia scavenger or absorber 30 forming a part of the ammonia dissociating apparatus 31. A pressure gauge 32 is preferably included to provide a continuous indication of the pressure in the inlet line to the flow meter 29.

Ammonia stored in a pressure vessel 33 flows under the control of a pressure regulator 34 into a reaction chamber 35 maintained at elevated temperature as, for example, about 1,200° F. by means of a heating coil 36 which may be energized under the control of a controller similar to the controller 18 mentioned above. Since close temperature control of the dissociator 31 is not critical, it has been found satisfactory to energize the heater coil 36 with a constant current, having a magnitude adequate to maintain the aforesaid temperature at or about 1,200° F. Within the reaction chamber 35 there extends an ammonia dissociating catalyst 37 which preferably comprises finely divided metallic iron. In one form of the invention, the catalytic element 37 comprised a tube open at its left-hand end as viewed in FIG. 1 and filled with alundum; that is aluminum oxide, in pelletized form, the pellets, particles or spheres have maximum dimensions less than about one-eighth of an inch. The aluminum oxide is porous and throughout the pores thereof there is dispersed finely divided metallic iron. The iron may be produced by impregnating the porous aluminum oxide pellets with an iron salt, such as ferrous chloride. The salt is then reduced by suitable means, as for example, by exposure to an atmosphere of hydrogen to produce the finely divided metallic iron dispersed throughout the pores. Such a catalyst has been found to be highly effective in producing nitrogen and hydrogen gases from the ammonia. In general, the catalytic element 37 will have a length so that the time of contact of the ammonia with the catalyst will assure complete dissociation thereof into its component parts of hydrogen and nitrogen. So as to eliminate from flow-line 26 any small amount of ammonia, there is interposed an ammonia scavenger or absorber 30. By an ammonia scavenger or absorber, I mean an arrangement which is pervious to nitrogen and hydrogen gases, but relatively impervious to ammonia. In one form of the invention, the ammonia scavenger or absorber 30 was formed by a molecular sieve of the type impervious to polar molecules. Suitable molecular sieves include those marketed by Linde Air Products Company as Types 4A and 5A, these being respectively of crystalline sodium and calcium alumino silicates from which there has been removed by heating the water of hydration.

From the molecular sieve 30 a gaseous mixture of three parts hydrogen and one part nitrogen flows by way of meter 29, valves 28 and 24, branch-line 27, line 23, valve 21, and by a flow-line 38 into the vessel 14. It is to be noted the hydrogen-nitrogen mixture from line 38 flows downwardly around the support 12 to produce within the vessel 14 a hydrogen-nitrogen atmosphere which is protective to element 11. The nitrogen in its molecular form is an inert gas. The hydrogen also in molecular form can react with oxygen to produce water vapor as will later be explained. The dissociated ammonia displaces or purges from vessel 12 the initial or existing atmosphere as by way of passage 14b provided at the bottom of vessel 14 for flow communication with the interior of furnace 10.

In manner later explained, the protective system automatically begins to function as the temperature of furnace 10 rises to about 1,200° F. The heating of the furnace is continued until it attains its desired operating temperature, which for carburizing, will be of the order of 1,700° F. Though it is feasible, and in practice sometimes desirable, to establish a desired carburizing or treating atmosphere within furnace 10 prior to loading the furnace and during the period of elevation of its tempertaure to the operating range, it will in general be preferred to initiate the generation of the treating or carburizing atmosphere after loading the furnace. Accordingly, it will be now assumed that furnace 10 has been loaded and has arrived at a temperature of about 1,700° F. The work may be heat-treated without loss of carbon, it may be carburized to establish therein a case of predetermined carbon content, or it may be that the work is to be nitrided.

Assuming that the work is to be carburized, a source of carburizing agent is supplied from a container 51 by a pump 52, preferably of the constant delivery type, and by way of a throttling valve 53 the carburizing agent enters furnace 10 through flow-line 54.

Since metal-treating furnaces are utilized for the treatment of work from diverse sources, it has been found that as the furnace is brought up to temperature, more particularly, above 1,200° F., there will frequently appear in the furnace atmosphere volatile materials of diverse character which, if deposited upon the sensitive element 11, may adversely affect its response to the desired constituent potential. By initiating and maintaining at temperatures above 1,200° F. a protective atmosphere about the sensitive element 11 comprising the dissociated ammonia, there is avoided the possibility of entry of contaminants into chamber 14.

The amount of time required for the temperature of the loaded furnace 10 to reach a desired control point value after the warm-up or start-up period (the time required to reach 1,200° F.) will depend upon the magnitude of the load and the selected control point value. In general, the temperature will be near its operating range and a carburizing atmosphere formed within a maximum time of one hour after reaching 1,200° F. Thus after about an hour, or other selected period, a timer provided as part of the controller or control box 55 is effective to energize through a circuit 56 the motor 15, which thereupon lowers the vessel 14 and the constituent-sensitive device 11 into the furnace 10 until it reaches its broken-line position. At the same time there is completed from the control box 55 an energizing circuit 57 for a motor driving the pump 44. Concurrently with the energization of motor 15, the solenoid 21a of valve 21 is deenergized for return of that valve to its illustrated position. There is thus established from the suction side of pump 44 a flow connection to the vessel 14 for withdrawal through the opening 14b of atmosphere from furnace 10 into vessel 14. Thus this vessel in which sensitive device 11 is located is now filled with the atmosphere of the furnace 10. The temperature of vessel 14 and its furnace atmosphere is thus maintained the same as, or in equilibrium with, that of furnace 10. In this connection, it will be noted that the opening 14b is directly below sensitive device 11. Thus the furnace atmosphere entering vessel 14 immediately contacts that element. The gases forming that atmosphere then flow upwardly and into line 38. They pass through line 22, a throttling valve 58, a flow-directing valve 59, a flow meter 60, and thence through line 42 to the filter 43 and to pump 44. The valve 59 is operated to its second position to by-pass meter 60 after initial adjustments of flow rates have been made.

Since the pressure from the ammonia dissociating system maintains check valve 48 closed, only the gases withdrawn from furnace 10 together with air drawn in through inlet 39 are discharged through throttling valve 49 to atmosphere.

As the constituent-sensitive element or device 11 attains a temperature above about 1,200° F., it begins to absorb or to give up carbon dependent upon the carbon or constituent potential of its atmosphere. Normally this atmosphere will be below the potential desired as determined by the setting of the measuring system. Accordingly, the motor 52m which drives pump 52 will be energized to continue the admission of carburizing agent to furnace 10 until the desired carbon potential shall have been attained. Should the desired potential have already been exceeded, then the sensitive element 11 will be effective in conjunction with the instrument 61 to deenergize motor 52m thereby to terminate the supply of the carburizing agent to furnace 10. As explained in my aforesaid Patent 2,698,222, the instrument 61 will be effective to provide an indication and a record of the carbon potential of furnace 10 during the subsequent hours of treatment usually needed to meet the required treating conditions for the work.

In order to establish maximum precision or accuracy in the control of the constituent potential of the furnace 10, it will be desirable to calibrate the sensitive device 11 after there is assurance it has attained temperature equilibrium with the furnace 10. Thus about half an hour after the sensitive device 11 has been lowered into the furnace 10, the calibrating operation may be initiated.

Upon operation of a calibrating switch 102, shown in FIG. 2, the solenoid 21a is energized to operate valve 21 to open the line 23 and to close the line 22. This reverses the flow through line 38. There is then introduced into that line the dissociated ammonia in mixture with a small fraction of air. The small fraction of air, by volume about 10% of the volume of the dissociated ammonia, is held below a value which would result in oxidation of the sensitive element 11. The added air is introduced by way of air inlet 39.

In mixture with the dissociated ammonia, the air reacts with hydrogen as the temperature of the mixture is raised in preparation for passing over the sensitive element. The nitrogen remains as an inert gas. This reaction between the hydrogen and the oxygen produces water vapor, which in turn is effective in decarburizing the sensitive element 11 to its reproducible minimum value of carbon concentration. It is also effective in reacting with free carbon which may have been deposited in the chamber housing the sensitive element 11. Accordingly, sufficient moisture must be available to carry the decarburization reaction to completion at the same time that the reaction with free carbon is occurring. Water as such can be added to the dissociated ammonia stream rather than air. Since a means for controlling the amount of water added appears to be more complicated and possibly less reliable than those for adding air, the latter is preferred. In any event, the permissible amount of air or water which may be added without oxidation of the measuring element is a function of the amount of soot or free carbon present in the chamber and the total exposure time of the element to the stream. The air inlet, though open during the production of the protective atmosphere after start-up, is not then effective to introduce air, since pump 44 is at standstill until started by the timer as described above. For carbon or constituent-control and for calibrating operations, pump 44 is continuously driven by its motor. The suction side of pump 44 is effective at inlet 39 to introduce air through filter 40.

The air flows through filter 40 where it is freed from all extraneous matter such as dust and the like, thence through a throttling valve 41 or other type of flow restriction. From throttling valve 41 it passes by way of a branch-line 42 through a second filter 43 needed, as will later appear, for the removal of extraneous particles from the stream entering the suction side of pump 44 through lines 38, 22, valves 58 and 59, flow meter 60, and line 42. Pump 44 is preferably of the constant delivery type. The air stream passes by way of line 45 through a flow meter 46, a throttling valve 47 and a check valve 48 to the line 23, where it mixes with the dissociated ammonia which enters line 23 by way of branch-line 27. The proportion of air to dissociated ammonia is small and is regulated by relative settings as between throttling valves 28 and 47. The ratio between the flow of dissociated ammonia and air is readily determined by reading the two flow meters 29 and 46. If the setting of throttling valve 28 is preset, throttling valve 47 will be used to change the flow of air. To vary the range of throttling action for valve 47, there is provided a further throttling valve 49 interposed in a branch-line from line 45 and effective to control the inlet pressure to flow meter 46. By varying the inlet pressure, the throttling valve 47 is made effective for different ranges of flow through the flow meter 46. Since the pressure of the dissociated ammonia is higher than the inlet pressure, there is provided a check valve 48 to prevent flow of the dissociated ammonia through meter 46 and throttling valve 49. This provision is important when valve 21 is in the illustrated position.

The aforesaid ratio is preferably kept low, that is below about one-tenth, that is about one part of air to ten parts of dissociated ammonia. This mixture of air and dissociated ammonia displaces the atmosphere within vessel 14 and thus initiates decarburization of element 11. This element, of the same composition as described in my said Patent 2,698,222, has its resistance reduced progressively until there is attained a minimum value which should be read on the carbon scale of instrument 61 as a value of −0.05% carbon. While this value on any absolute carbon scale is fictitious, it does always correspond to a particular value of resistance for a sensitive element of a given composition, a given length and a given diameter at a given temperature. In the present invention, there is utilized the attainment of that predetermined value of carbon concentration and its attendant value of resistance and its existence for a given time interval to terminate the calibrating operation and to restore the operation of the furnace 10 under the control of the device 11 to maintain that constituent potential of the atmosphere of furnace 10 at a selected value.

In contrast with the system of my Patent 2,698,222 where I utilized in conjunction with a timing relay a rise in the resistance value of the sensitive element after attainment of a minimum resistance value to signal the end of the calibrating operation, in accordance with the present invention there is avoided the need to utilize a reversal of the direction of change of said resistance. This change in operation is deemed highly advantageous since there is avoided by reason of the protective atmosphere oxidation of the sensitive element which has heretofore been the primary cause of rise in resistance, a rise somewhat indeterminate due to the imposition of the time delay operation required to avoid false indications of attainment of the calibrating value in my prior system.

The advantages of the present system will be developed in connection with the control system illustrated in FIG. 2.

Referring now to FIG. 2, the details of the control system for FIG. 1 will be described in terms of automatic operation of the system of FIG. 1, that is to say, with switch 74 closed on the A (automatic) contact. As the furnace 10 of FIG. 1 is elevated to a temperature of 1,200° F., the instrument 19, which measures and records that temperature, through a mechanical connection 19a closes contacts 67a, 67b and 67c. Closure of contacts 67a partially completes an energizing circuit for the fluid pump motor 52m of pump 52. The fluid pump motor 52m may now be energized upon closure of the contacts of relay 73.

It will be remembered that during the initial start-up period for the furnace, the protecting element 11 occupies its full-line position as illustrated in FIG. 1. Accordingly, element 11 is at a relatively low temperature, near room temperature. Accordingly, its resistance is low, and there is produced from a measuring circuit 82 illustrated as of the Wheatstone bridge type an output which is applied by way of conductors 80 and 81 to the input of an amplifier 78. The operation of the bridge 82 and the operation of a modulating network 79 included in the input circuit to the bridge will be later described in detail. The output from amplifier 78 is adequate to energize the relay 77 to close its a and b contacts and to open its c contacts.

It is important to note that the relay 77 is a three-position relay, that is to say that the a and b contacts can be closed while the c contacts are open; with decreased output from amplifier 78, the a, b and c contacts can all be open at the same time. When the output of amplifier 78 is further decreased, the c contacts are closed and the a and b contacts are opened. Upon closure of the a contacts, an energizing circuit from supply line 71 for the operating coil of the relay 76 is partially completed. The circuit, it will be noted, extends by way of conductors 76c and 94 to the contacts 67c which are closed by the temperature-measuring instrument 19 as the furnace attains its temperature of about 1,200° F. to complete the energization circuit for relay 76. With energization of relay 76, its a contacts close to complete an energizing circuit for the relay 73. The motor 52m is energized by the closing of the relay 73. The motor 52m drives pump 52 to deliver carburizing fluid to the furnace 10 of FIG. 1. The b contacts of relay 76 complete an energization circuit for the modifying network 79. This modifying or modulating network performs the same functions as described in my Patent 2,698,222 and may be of the type shown in Davis Patent 2,325,232. The modifying network is known to those skilled in the art as the "duration adjusting type."

The network 79 produces intermittent opening and closing of relay 77 and through relays 76 and 73 intermittent operation of motor 52m.

As may also be noted, when the furnace reaches its aforesaid temperature and contacts 67b close, the energizing circuit for the solenoid 24a of valve 24 is also completed. This safety valve 24 is then operated to open the passage between lines 26 and 27 and to close passage 25, FIG. 1.

As the furnace reaches its 1,200° temperature, an energizing circuit is also completed for a relay 90, which circuit may be traced from supply line 71 by way of conductor 91, the c contacts of a relay 92, a switch 93 illustrated in its C or "control" position, the coil of relay 90, conductor 94, and contacts 67c to the other side of the line 72. Relay 90 then operates to open its b and d contacts and to close its a and c contacts. An energizing circuit is completed for the solenoid 21a of valve 21. This circuit may be traced from supply line 71 by way of conductor 65, the c contacts of relay 90, solenoid 21a, the a contacts of relay 90, conductor 94, and by contacts 67c to the other supply line 72. Thus, valve 21 is now energized to close line 22 and to establish communication between lines 23 and 38 of FIG. 1.

It will be noted that when both valves 21 and 24 have been actuated, there is established a flow for the dissociated ammonia which flows to the housing 14 to purge from it the existing atmosphere and thereafter to maintain the element 11 in an atmosphere of nitrogen and hydrogen during the subsequent elevation of the furnace temperature from 1,200° F. to its operating temperature normally about 1,700° F. It has been found that if a predetermined time be provided for further heating of the furnace after it attains 1,200°, it will be known with a fair degree of certainty that it will acquire a carburizing atmosphere and a temperature near its operating range. Accordingly, a timing relay 97 is provided to initiate the control operations which will lead to the lowering of the element 11 into the furnace so that it may function to control the constituent potential within the furnace. The timing relay 97 will preferably be of the motor-operated type; however, for simplicity it has been illustrated as including a dashpot 97t to illustrate the delay in contact actuation. After a preselected interval of time, which may be about an hour from the time the coil of relay 97 is energized, it closes its contacts to complete an energizing circuit for relays 92 and 98.

The relay 92 thereupon opens its normaly closed a and c contacts and closes its b contacts to energize the motor 15 for rotation in a direction to drive the threaded member 16 to lower the housing 14 inwardly of the furnace to bring the sensitive element 11 to the broken-line position of FIG. 1. Upon energization of relay 92, its a and c contacts are opened. This prevents operation of motor 15 in a direction to raise housing 14, and de-energizes relay 90 which thereupon returns to its illustrated position deenergizing solenoid 21a. Accordingly, valve 21, FIG. 1, returns to its illustrated position to establish communication between lines 22 and 38.

As already described, closure of the contacts of timing relay 97 also energized the relay 98. This relay, upon closing, energizes the motor 44m for the suction pump 44 which is then effective to apply suction to the housing 14 for withdrawal of furnace atmosphere into that housing and into intimate contact with the sensitive element 11.

Usually the constituent potential desired in the furnace will be below its selected value. Accordingly, the relay 77 will periodically remain in its illustrated energized position. However, as the constituent potential approaches its selected value, the output from the bridge 82 will decrease and so will the output from amplifier 78. Thus relay 77 will operate to keep open its a and b contacts but without closing its c contacts. When this occurs relay 76 will remain deenergized and through its a contacts which deenergize relay 73, causes the motor 52m to remain inactive. This will interrupt flow of the carburizing agent from supply 51 to the furnace 10, FIG. 1. Thus the constituent potential of the furnace is maintained at its selected value by periodic cyclic operations of relays 77 and 76 which regulate the operation of motor 52m to maintain the constituent potential at its selected value. This value will be selected by operation, as by a knob 100, the contact 101a of a slidewire 101 having associated therewith a scale 101s of carbon values which may extend from 0 to 1.40.

Normally, it will be desirable at the beginning of a run, after the furnace has been at operating temperature for about half an hour, to initiate calibrating operations in order that the constituent potential may be measured with greatest precision. These operations are initiated by momentarily depressing a calibrating switch 102 to close its normally open contacts. There is then energized a relay 104 through a circuit which may be traced from supply line 71 by way of conductor 105, the contacts of a timing relay 106, conductor 107, operating coil of relay 104, conductors 108, 109, and the push-button operated contacts to the other supply line 72. The relay 104 closes its a, b and c contacts. The a contacts complete their own holding circuit which may be traced through conductors 108 and 109, conductor 110, the a contacts, and conductor 111 to line 72. The a contacts of relay 104 serve to establish a connection from line 72 by way of conductors 111, the a contacts, and conductor 110 to maintain conductor 109 energized for the duration of the calibrating period. It may also be observed that energization of conductor 109 also results in energization of solenoid 21a to move valve 21 to close off line 22 and establish a flow path between line 23 and line 38 so that the mixture of air and dissociated ammonia may flow into vessel 14, as will be seen in FIG. 1. The circuit for energization of solenoid 21a may be traced from line 71, conductor 105, contacts of timer relay 106, conductor 66, the d contacts of relay 90, the solenoid 21a, the b contacts of relay 90, to conductor 109.

Depressing the calibrating switch 102 also completes an energizing circuit for a transfer relay 112 which also remains energized as long as conductor 109 is energized. Relay 112 operates to open its a contacts and to close its b and c contacts. The relay 112 through its b contacts effectively transfers the output of the bridge from contact 101a to a connection midway of resistors 113 and 114, which resistors establish a potential point corresponding to −0.05% carbon. The bridge will be maintained in balance prior to and at the time when the carbon within sensitive element 11 has been reduced to a value which in relation to the scale associated with slidewire 101 is at a value of −0.05% C.

The c contacts of relay 112, while closed, by-pass the modulating network to eliminate the cycling action introduced by it. At the time of operation of the transfer relay 112, the element 11 will include a high value of carbon relative to −0.05% C. Accordingly, the bridge 82 will have a small output and relay 77 will be deenergized so that its c contacts will be closed. In order accurately to determine when the carbon in element 11 has been reduced to its calibration value, further provision is made to maintain the bridge in balance by relay 77 and amplifier 78. Thus it will be seen that resistor 114 is adjustable. So is a resistor 115 in an adjacent arm of the bridge which arm also includes a fixed resistor 116.

With the c contacts of relay 77 closed and the relay 104 energized, its b and c contacts will be closed. Thus a winding 117b of a motor 117 will be energized for rotation of the motor in a direction to move the contacts of resistors 114 and 115 in directions to increase the included portion of resistor 114 in its arm of the bridge and to decrease the included portion of resistor 115 in its arm of the bridge. As soon as balance is attained, the output from the bridge increases to increase the energization of relay 77 to open its c contacts. Thus the motor 117 is deenergized, and it remains deenergized until the bridge 82 is unbalanced in an opposite sense by reduction of the carbon content in element 11 due to decarburization with a corresponding reduction in its resistance.

When this occurs, the output from amplifier 78 increases to operate relay 77 to close its a and b contacts. With closure of the a contacts, relay 76 is again energized and initiates flow of carburizing agent to the furnace. Thus, during the calibrating period the carburizing agent is periodically supplied to the furnace. It has been found that the constituent potential will thus be maintained during the calibrating period within, or reasonably near, the regulating range for the final desired value. The closure of the b contacts of relay 77, with relay 104 energized, now completes an energizing circuit for the motor winding 117a which is thereupon energized for rotation of motor 117 in a direction to rebalance the bridge 82 by adjustment of the contacts of resistors 114 and 115 in directions opposite to that effected by energization of motor winding 117b.

There is completed through the b contacts of the relay 118 an energizing circuit for that relay. It opens its b contacts (through which it was energized) after closing its a or holding contacts. This holding circuit may be traced from line 71 by way of conductor 119, said a contacts, the relay coil conductor 120, normally closed contacts of calibrating switch 102, conductors 109 and 110, the a contacts of relay 104 and by conductor 111 to line 72. Thus the relay 118 remains energized during the remainder of the calibrating period. This assures that upon opening of the c contacts of relay 118, the motor winding 117b may not again be energized during the calibrating period. This represents one of the features utilized in the automatic calibration of bridge 82 at −0.05% carbon.

Another feature important to the automatic calibration of bridge 82 includes the provision of a relay 122 whose operating coil is energized each time the motor winding 117a is energized, which occurs each time the b contacts of relay 77 close. It will be seen that after relay 118 is energized, its a contacts also complete an energizing circuit for the timing relay 106 by way of the contacts of relay 122. This circuit is interrupted each time the motor winding 117a and relay 122 are energized. This circuit may be traced from supply line 71 by way of conductor 119, the a contacts of relay 118, the normally closed contacts of relay 122, conductor 124, the coil of timing relay 106, conductor 120, the normally closed contacts of calibrating switch 102, conductors 109 and 110, the a contacts of relay 104, and by conductor 111 to line 72.

From the foregoing, it will be seen that relay 106 will be energized as a result of the first, and only the first, energization of winding 117a. Each time relay 122 is deenergized, a new timing cycle for the relay 106, which in practice can be a motor-operated timer, will be initiated.

After the expiration of a selected time interval, following its energization, the timing relay 106 opens its contacts to terminate the calibrating operation. At that time it is known that the carbon content of element 11 has been reduced to its fixed and reproducible value of −0.05 carbon. That it will be at such value will be apparent from the following considerations.

The amplifier 78 is provided with substantial gain so that the pulsing or cyclic energization of relay 77 occurs at a relatively high frequency during the initial part of the calibrating operation with resultant pulsing of motor 117 to maintain the bridge 82 in approximate balance. As the carbon content of element 11 approaches its reproducible low value, the cycling rate decreases which in terms of the timing relay 106 means that it is energized for progressively longer lengths of time. It has been found that under the conditions outlined, if the bridge 82 remains in balance for a period at least equal to about four minutes, five being a safe margin, it will be known that the carbon content of element 11 will have a value corresponding with −0.05. Thus, as the cycling continues, the relay 77 remains deenergized during progressively longer periods of time. When the period is as long as four minutes, the timing relay 106 is energized long enough to time-out, that is, to open its contacts thereby to terminate the calibrating operation. As will later be explained, when the contacts of timer 106 are opened, the carbon potential in the furnace 10 is returned to automatic control in accordance with the response of newly calibrated element 11 to the carbon potential. Before describing these operations, several additional features of the bridge 82 will be pointed out.

The arm of the bridge adjacent element 11 has a resistor 125 of magnitude to balance the resistance of element 11 and also includes a temperature compensating resistor assembly 126, a movable contact of which is operated by the temperature-measuring instrument 19 to compensate in bridge 82 for variations in the temperature of the furnace 10. More particularly, that contact is adjusted so that the response of the bridge 82 is not affected by change in the temperature of element 11. In the arm including resistor 114 there is an additional resistor 127 which corresponds with resistor 116 in the opposite arm. As already mentioned, resistor 113 provides the point of "−0.05" and to which is connected conductor 136.

It will be observed that the output of the bridge 82 is also applied by way of conductors 129 and 81 to an amplifier 132 of a measuring instrument 61. The balancing motor 133 of that instrument not only drives a pen-index but also a contact 134a of a slidewire 134. Slidewires 134 and 135 are energized from a source of supply. By rotating a knob 100, contacts 101a and 135a may be adjusted for the selection of a given carbon potential to be maintained in furnace 10. The contact 135a is moved with contact 101a in order to introduce into the circuit controlled by the amplifier 132 a correction for change in the output of the bridge resulting from the movement of contact 101a. Accordingly, the instrument 61 will at all times accurately indicate and record the carbon potential of the atmosphere of the furnace as determined by the element 11. In this connection, it may be noted that at the start of the calibrating operation the resultant initial large unbalance to the instrument 61 will appear as a higher resistance for element 11. Accordingly, the motor 133 will drive the pen-index toward the upper end of the scale.

When the timer or relay 106 opens its contacts to signal the end of the calibrating operations, they open the energizing circuit for relay 104 which then operates to open its contacts. The opening of the circuit through the a contacts of relay 104 interrupts the previously described circuit from line 72 to line 109. This deenergizes the relay 118 and it returns to its illustrated position. Relay 112 is similarly deenergized, and it reutrns to its illustrated position to return the supply connection for the bridge 82 from conductor 136 to the conductor 137 leading to contact 101a. As relay 112 opened, it, of course, opened its c contacts again to render effective the modulating network 79. The source of supply for the bridge 82 is from a transformer 138. One side of the secondary winding feeds one of each of the pairs of a and b contacts of relay 112. The other side of that winding through conductor 139 is connected to the juncture between resistor 125 and element 11.

The opening of the timer relay 106 interrupts the energizing circuit for the solenoid 21a of valve 21 which thereupon returns to its illustrated position in FIG. 1 to reestablish suction on line 38 to introduce the atmosphere of furnace 10 into contact with the element 11. The solenoid 21a remains deenergized during the subsequent normal operations by reason of the opening of the circuit to line 109 upon deenergization of relay 104 and the opening of its a contacts.

The system has now been restored to operation under the control of element 11 to maintain the carbon potential in furnace 10 of FIG. 1 as selected by the position of contact 101a relative to its associated scale.

The system of FIG. 2 includes additional features to provide considerable flexibility in the operation and control of the furnace 10 of FIG. 1. For example, a bypass switch 140 may be closed at any time when the housing 14 and element 11 are in the illustrated raised position to energize a relay 141, provided the furnace is at about 1,200° F. and contacts 67c are closed. The lower normally open contacts of relay 141 provide a holding circuit to maintain the relay energized and the upper contacts closed. Through the upper contacts, the relay 92 is energized to close its b contacts for operation of motor 15 to lower the housing 14. The motor is deenergized at the two limits of operation of housing 14 by the limit switches actuated by element 142.

If with the furnace 10 of FIG. 1 up to the minimum temperature of 1,200° F., it is desired manually to control the atmosphere of the furnace, the manual switch 74 will be operated to its M or manual position and it will through conductor 75 energize relay 73 for operation of motor 52m to supply the carburizing agent to furnace 10. Though the motor 44m driving the suction pump 44 is de-energized as a result of movement of switch 74 to the manual position, nevertheless the valves 21 and 24 remain in their energized positions for flow of dissociated ammonia from the dissociator 31, FIG. 1, to vessel 14 to maintain about element 11 a protective atmosphere throughout the period of manual operation. In this connection it is to be noted that when the switch 74 is moved to the M position, the relays 97 and 92 are deenergized, thereby to complete an energizing circuit for the motor 15 for rotation in a direction to move upwardly the housing 14 and to remove from the furnace the element 11. Thus while it is protected by the protective atmosphere of nitrogen and hydrogen, it does not lose carbon during its inactive period because of the rapid reduction of its temperature below the decarburizing range when moved out of the furnace chamber.

It will be remembered that with the switch 74 in the A or automatic position, the element 11 was protected by an atmosphere of nitrogen and hydrogen for a time after the arrival of the furnace at 1,200° F. as determined by the timing relay 97. It will also be remembered that at the end of the time interval the relay 92 was energized to deenergize through its contacts 92a the relay 90, this occurring as the element 11 was returned to the broken-line position shown in FIG. 1.

If it be desired to maintain the protective atmosphere on the element 11, the switch 93 may be moved from its C or control position to its S or safety position. In the latter position, the relay 90 is energized directly from supply line 71. Accordingly, the valve 21 is maintained in its energized position to close line 22, FIG. 1, the solenoid 21a thereof being energized from line 71 by way of conductor 65, the c contacts of relay 90, solenoid 21a, and thence by the a contacts of relay 90, conductor 94, and the temperature control contacts 67c to line 72. This feature of the operation of the switch 93 for selectively producing a protective atmosphere about the sensitive element 11 is quite useful, particularly when the atmosphere within the furnace 10 may produce sooting conditions in the region of element 11. It is also useful for any abnormal operations which may arise in the operation of the furnace 10 and which may be deleterious to element 11. At any time it is desired to prevent exposure of element 11 to the atmosphere of furnace 10, switch 93 is operated to its S or safety position, and there is thus a change in the flow of the atmosphere to element 11. The change is one in a direction to produce about element 11 the protective atmosphere and to prevent flow about that element of the furnace atmosphere. For protective purposes alone, nitrogen or a similar inert gas from any suitable source of supply may be utilized, though as illustrated, the dissociated ammonia has been found quite satisfactory both for the calibrating operations and for the safety functions under discussion.

Figure 3:
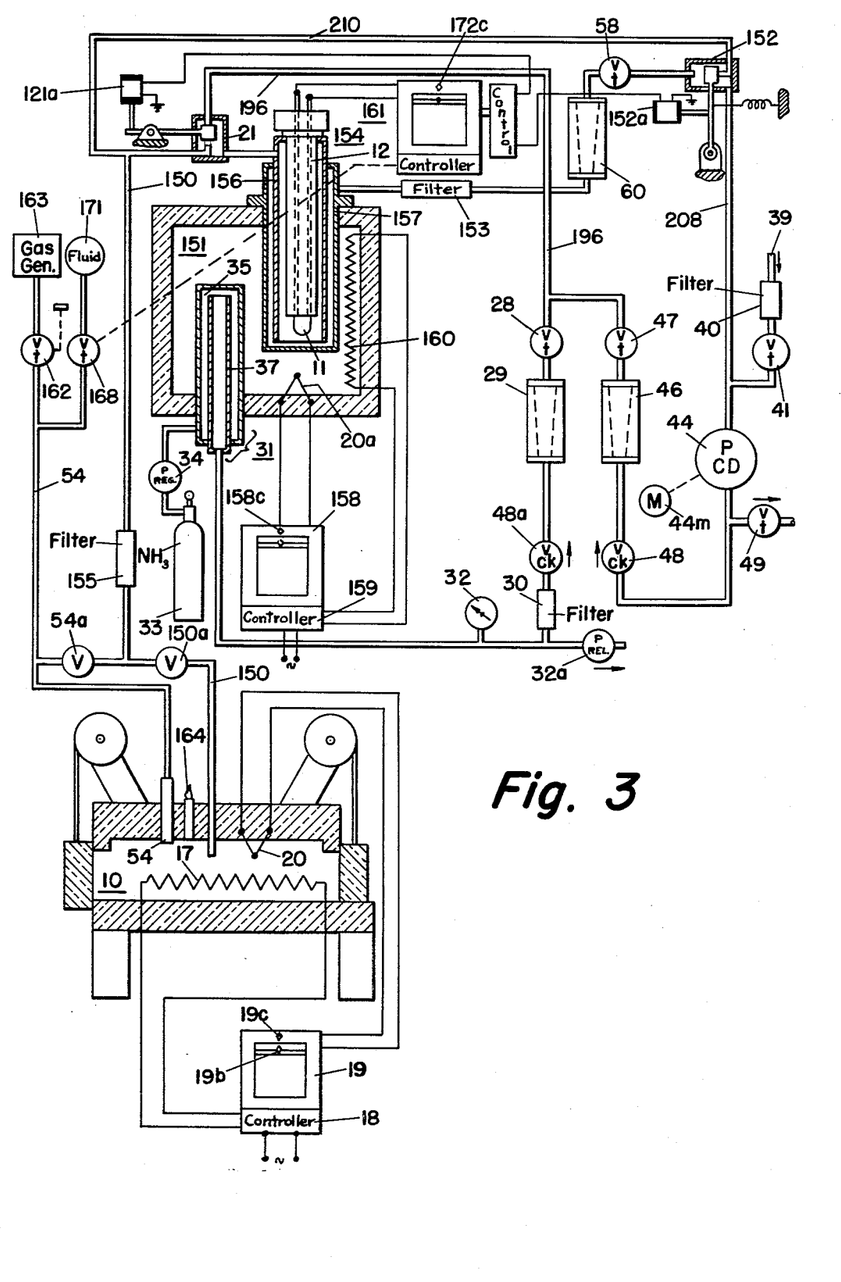
FIG. 3 diagrammatically illustrates another embodiment of the invention.

Referring now to FIG. 3, the treating or carburizing furnace 10 is to be taken as representative of existing furnaces of many types now in use in the metal-treating industry. Such furnaces widely differ in size and mechanical construction and may, due to their own constructional features and location in a plant, make it impractical to install the potential measuring element and system of FIGS. 1 and 2. In accordance with the modifications of FIGS. 3 and 4, there is provided a constituent control system for existing furnaces which is easy to install, adequately reliable in operation, and satisfactorily precise in measurement of constituent potential. More particularly, there is provided for the furnace 10 a sampling line 150 which is preferably of a material having high heat conductivity.

It will be remembered that the carburizing temperature within furnace 10 will be within a range upwardly of 1,600° F. Accordingly, there will be a high mean temperature difference between the outer surface of the thin-walled tube or pipe 150, at ambient or room temperature, and the hot stream of gas flowing through the tube, which may be made of from ¼ inch to ½ inch diameter copper. There is thus provided rapid cooling of the sample gas. The cooling is at a rate such that by the time the gas passes from the mouth of the tube to its point of departure from the insulated wall of the furnace, the temperature of the sample stream has been dropped from about 1,600° F. to a temperature of the order of 300° F. With this rapid fall of temperature, it has been found that the carburizing atmosphere, loaded with carbon, does not lose its carbon content by precipitation or dropping out of the carbon. Instead, the sampling line is effective to transfer the furnace atmosphere 10 to the sensitive device or element 11 shown disposed in a measuring assembly including a furnace 151. As in the preceding modification, the flow of the sample stream is produced by the suction developed from pump 44, the suction being applied by way of a valve 152 which in its illustrated position interconnects the suction side of the pump 44 to the throttling valve 58 for application by way of the flow meter 60, the filter 153, a removable assembly 154, a calibrating valve 21, and sampling line 150 to the furnace 10.

It is to be noted that the sampling line 150 includes a filter 155. This filter is preferably of the type which includes materials with which sulphur present in sulphur-bearing gases can be removed. More particularly, the filter may comprise granules or "turnings" of copper or iron. These materials may also be in the form of metal "wool," and in any event are maintained at temperatures of the order of a "red heat." Other materials may be utilized, as understood by those skilled in the art. For example, oxalates and tartrates supported on sawdust will be satisfactory as sulphur-removing filter agents. With the latter materials, the filter will not be heated but will operate satisfactorily at room temperature. Thus with the sample of the furnace atmosphere free of sulphur, a purified stream is delivered to the assembly 154. This assembly, as already noted, includes the sensitive element 11. This element 11 is supported by the supporting tube 12 and is mounted within a tube 156 surrounding the inner tube 12. Tube 156 is closed at its upper end and terminates in an open end disposed just below the sensitive element 11. The sampling line 150 is connected through valve 21 to the upper end of the space between tubes 12 and 156. The sensitive element 11 is shielded from the interior of the furnace 151 by an outer closed-end tube 157 which by an outwardly extending flange is supported from the upper wall of the furnace 151. The tubular assembly 154, as will be later explained, is built as a unit so that it can be bodily removed from, or inserted in, the furnace 151. When removed, the assembly as a whole may be supported from the flange on the well or outer tube 157 and in manner similar to the way it is supported in furnace 151.

The filter 153 is provided to remove any free carbon or other particles to minimize dirtying the sight tube of flow meter 60.

Since the resistance of sensitive element 11 varies with temperature, the measurement of carbon potential by locating the element 11 in heat-exchange relation in furnace 151 in determination of the carbon potential of furnace 10 is accomplished with or without compensation for the temperature of the element 11 depending upon the type of operation employed. As in the modification of FIG. 1, the temperature of furnace 10 is regulated or maintained at a selected value by a controller 18 which responds to change in temperature as determined by a measuring instrument 19 connected to thermocouple 20. It will be noted that the measuring instrument 19 has a pen-index 19b which is at all times effective to indicate the temperature of furnace 10. The instrument 19 is also provided with a control-setter indicator 19c which, as illustrated, has been set to a particular position on the scale indicative of the temperature at which furnace 10 is to be maintained. Similarly, furnace 151 is provided with a thermocouple 20a connected to a measuring instrument 158 and a controller 159 which controls the energization of a heating coil 160 in furnace 151 to maintain the temperature of that furnace at the control point as indicated by the control point setter 158c. Thus with the control setter 158c set at the same temperature on the scale as the control setter 19c, the temperatures of the two furnaces 10 and 151 will be the same, and there need not be introduced into the measuring system including the measuring instrument 161 a temperature correction factor.

It is to be noted that the furnace 151 can be operated at a temperature differing from that of furnace 10. In such event, it will be necessary to employ a temperature correction factor, i.e., there will be utilized data correlating the change in the constituent potential due to the atmosphere being at a different temperature in furnace 151 than in furnace 10 and in some cases also the change in the resistance of element 11 due to the difference in the temperature.

It is to be observed that in FIG. 3 the ammonia dissociator 31 is located in the furnace 151. In this connection, it has already been mentioned that the dissociator may have its own heating arrangement, or it may be located in furnace 10 or, as shown, in furnace 151. The dissociated ammonia is in the system of FIG. 3 utilized both to provide a protective atmosphere for the sensitive element 11 and to achieve decarburization thereof for calibrating purposes. A pressure relief valve 32a is provided for the flow line leading from the dissociator 31. Though not shown in the system of FIG. 1, it may be added for reasons of safety.

Because of the similarities of operation as between the two modifications, further features of the system of FIG. 3 will be discussed in conjunction with its wiring diagram as appearing in FIG. 4.

In starting up the system of FIG. 3, the heating resistors 17 and 160 of furnaces 10 and 151 will be continuously energized though under the control of controllers 18 and 159, FIG. 3. After a number of hours, the furnaces will reach a temperature within the control range, and thereafter their controllers 18 and 159 will function to regulate the heat input to the furnaces to bring their temperatures to, and to maintain them at, their respective control points as established by the control point setters.

During the warming-up period, the assembly 154 will be resting in a frame support (not shown) in a location outside the furnace. Thus the element 11 will be maintained at room temperature during the warming-up period, and it will, therefore, be unaffected by anything occurring in the furnace. After the temperature has risen to within the control range, one of the doors of furnace 10 will be elevated to charge the furnace with work. This may occur before the establishment in furnace 10 of a treating atmosphere, though the more general practice will be first to establish the treating atmosphere before the charging of the furnace. Accordingly, as the temperature of furnace 10 rises above 1,200° F., a valve 162, FIG. 3, will be opened to admit from a gas generator 163 a supply of gas to line 54. The gas generator 163 is conventional and in some instances may be replaced by any source of fuel or carrier gas of the type used for heating and cooking purposes. This gas displaces from furnace 10 the air initially present therein. The furnace 10 has an opening through which gas escapes and which appears as a flame 164.

With the temperatures of furnaces 10 and 151 within the range of from 1,400° F. to 1,700° F., automatic control of the constituent potential of furnace 10 can be initiated. The suction pump 44 to brought into operation by operation of the switch 165, FIG. 4, to close the energizing circuit for motor 44m. Thus, there is withdrawn from furnace 10 a mixture of the carrier gas which passes through line 150, the filter 155, and through valve 21 into the assembly 154. Thus, the carrier gas is used both to displace any air from the furnace 10 and also to displace any air which may be in the lines or in the assembly 154. Gases introduced into the assembly 154 exit by way of filter 153, flow meter 60, throttling valve 58, valve 152, flow line 208, the suction side of pump 44, and from the high pressure side of the pump are discharged by way of throttling valve 49 to point of safety, generally outside the building housing the heating equipment.

The control assembly 154 may now be inserted in furnace 151 rapidly to heat the sensitive element 11 to the same temperature as that maintained in furnace 151. After this heating period, relatively short, of the order of fifteen minutes, a manually operable switch 166, FIG. 4, is closed partially to complete an energizing circuit for a solenoid 167 of a supply valve 168. This circuit is completed by the closure of the contacts of a relay 169. The relay contacts will be closed since a controller 170 will have an output energizing the coil of the relay 169. Accordingly, with the opening of valve 168, a carburizing agent from a supply tank 171, FIG. 3, will be admitted to line 54. This carburizing agent in mixture with the carrier gas then enters furnace 10 to establish therein a carburizing atmosphere. The carburizing agent may be either a liquid or gas. Propane is frequently used.

The relay 169 is, in conjunction with controller 170, utilized to control the carbon potential of the atmosphere in furnace 10. The controller itself is preferably the type fully disclosed in Davis Patent No. 2,823,861. This controller includes in its input a control slidewire 172 bodily rotatable relative to its associated contact 172a as by the mechanical connection illustrated by the broken lines from a motor 174 operable under the control of an amplifier 175. The contact 172a can be moved relative to slidewire 172 and independently thereof as by a knob 172b to establish the control point for controller 170. By control point, I mean the setting required of contact 172a to maintain a desired carbon potential within furnace 10. Through a mechanical connection (not shown), the knob 172b is utilized to position the index 172c of the control point setter mounted on instrument 161. That instrument is similar in function to the instrument 61 of FIGS. 1 and 2.

Figure 4:
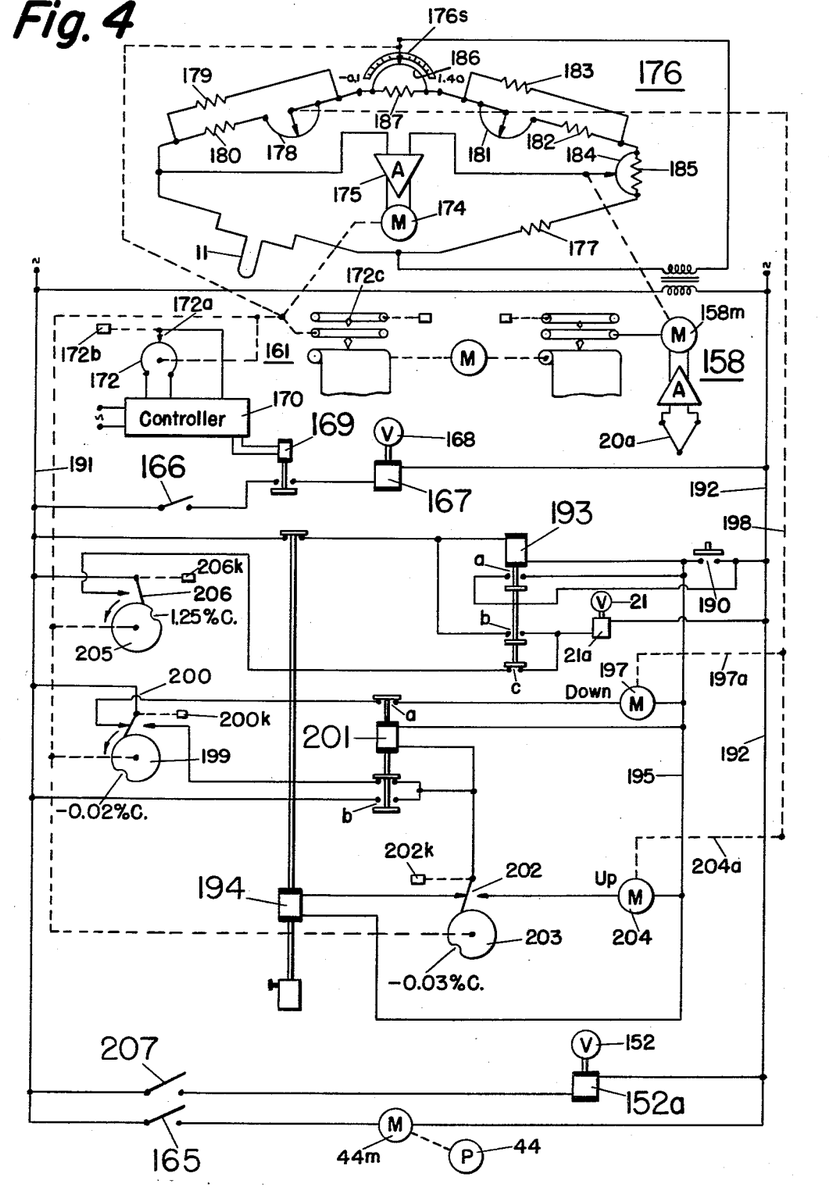
FIG. 4 is a wiring diagram of the system of FIG. 3.

As shown in FIG. 4, instrument 161 includes a Wheatstone bridge 176 in which the element 11 is included in one arm. A resistor 177 is included in an adjacent arm. Each of the opposite arms respectively includes rheostats 178 and 181. A resistor 180 is in series with rheostat 178, and the series combination is shunted with a resistor 179. Similarly, a resistor 182 is in series with rheostat 181, and the series combination is shunted by resistor 183. Between the latter arm and resistor 177 is a slidewire resistor 184 shunted by a resistor 185. Between the two arms including the rheostats 178 and 181 is a slidewire resistor 186 shunted by a resistor 187. The movable contact of slidewire 186 is driven by motor 174 through a mechanical connection indicated by the broken line. The contact of slidewire 184 is driven by a motor 158m forming a part of the instrument 158 to introduce compensation for the temperature of element 11. The instrument 158 includes an amplifier to the input of which is connected the thermocouple 20a disposed in furnace 151, of FIG. 3.

Since at the beginning of operations, the carbon potential in furnace 10 of FIG. 3 will be quite low, the motor 174 will have been energized to drive the contact of the slidewire 186 toward the lower end of the scale. At the same time, the motor 174 will rotate slidewire 172 relative to contact 172a to produce an output from the controller 170 which energizes relay 169. As the carbon potential of furnace 10 rises to the control range, the controller 170, in manner explained in said Davis Patent 2,823,861, will intermittently energize relay 169 to open and close valve 168. The "on" time (the time the valve is open) relative to the "off" time (the time the valve is closed) will be varied automatically in response to change in load and deviation from the control point, to maintain quite accurately at a selected value the carbon potential of the atmosphere in furnace 10.

In the above brief description, it has been tacitly assumed that the sensitive element 11 is "in calibration," that is, the relation between its resistance and its carbon content has not been affected by interim conditions. In order for the work to be subjected to an atmosphere of desired constituent potential, it will ordinarily be desirable to initiate a calibrating operation shortly after conditions have stabilized in furnace 10 of FIG. 3 following the loading thereof with work.

The calibrating operations are initiated by momentary closure of a calibrating switch 190. There is then completed from a supply line 191 an energizing circuit for the operating coil of a relay 193. This circuit extends through the normally closed contacts of a timing relay 194. The a contacts of relay 193 are closed to complete a holding circuit for relay 193 and to connect a conductor 195 to supply line 192. The closure of the b contacts of relay 193 completes an energizing circuit for the solenoid 21a of valve 21 which, FIG. 3, transfers the connection to the assembly 154 from line 150 to a line 196 for establishment therethrough of a flow of dissociated ammonia from the dissociator 31. The dissociated ammonia has admixed therewith air admitted and controlled as to quantity in the manner described in connection with FIGS. 1 and 2. There is thus initiated the decarburizing of the element 11. In this connection, it will be seen that air in volume up to about 10% or more of the dissociated ammonia is in the arrangement of FIG. 3 added to flow line 196 after passage through the flow meter 46 and throttling valve 47. Because of the illustrated connection, a check valve 48a has been included in the branch line from the dissociator 31.

Upon energization of relay 193, there is completed an energizing circuit for a motor 197 which motor through broken-line connections 197a and 198 drives the movable contacts of calibration resistors or rheostats 178 and 181 in directions to unbalance the bridge 176 in the same manner as would occur upon reduction of the carbon content of element 11 to a value corresponding with −0.02% carbon. As soon as the contacts of rheostats 178 and 181 begin to move, the resultant unbalance of the bridge 176 through amplifier 175 energizes motor 174 for operation in a direction to restore balance, that is to say, to drive the contact of slidewire 186 downscale to a corresponding value of −0.02% C. When this point on the scale 176s has been attained, the notch of a notched cam 199 driven from motor 174 opens the motor circuit traced through the left-hand contacts of a switch 200, and closes a circuit through the right-hand contacts to energize a relay 201. This relay opens its *a* contacts to prevent later energization of motor 197 upon later closure of the left-hand contacts of switch 200. The closing of the *b* contacts of relay 201 completes a holding circuit for its operating coil and also a circuit to a cam operated switch 202. This circuit extends to the operating coil of a timing means, shown as the timing relay 194. This timing relay 194, though energized, does not open its contacts until the expiration of an interval of time, such for example, as about five minutes, and adequate to assure the attainment by the element 11 of its reproducible low carbon content.

While the bridge 176 is temporarily in balance at the time the cam operated switch 200 is operated, the removal of carbon from element 11 with its consequent reduction in the value of resistance of that element unbalances the bridge in a direction showing decreased carbon in element 11. As soon as this occurs, the motor 174 restores balance by operation of the contact of slidewire 186, and at the same time operates the cam 203 of switch 202 to open the circuit through its left-hand contacts and to close a circuit for a motor 204 through its right-hand contacts. This motor, through a mechanical connection 204a and connection 198 thereupon drives the contacts of the rheostats 178 and 181 upscale again to tend to unbalance the bridge 176.

It is to be here noted that upon the opening of the left-hand contacts of switch 202, the timing relay 194 is deenergized. Each time that relay is deenergized, it resets itself so that a new timing cycle is initiated when the relay is again energized.

For each readjustment of rheostats 178 and 181 by motor 204, there is immediate operation by the bridge 176 produced by motor 174 to adjust contact 176s to maintain the bridge 176 substantially in balance and in so doing operates cam 203 to open the circuit to motor 204 and to close the circuit of the timing relay. This cyclic operation continues as long as the resistance of element 11 is changing. As its resistance approaches a value corresponding with a carbon content of −0.02%, the rate of change in resistance becomes less and less, and the timing relay 194 is energized for increasingly longer intervals.

In this connection, it is to be noted that whenever the motor 174 is energized to operate switch 202 to energize motor 204, there is an immediate unbalance of the bridge in an upscale direction which thereupon causes the motor 174 to rebalance in the downscale direction immediately to open the contacts of switch 202 to deenergize motor 204.

Whenever the motor 204 remains deenergized for a period of approximately five minutes, it is known that the resistance of element 11 has attained its minimum low value corresponding with the carbon content of between −0.02% and −0.03%. Thus at the end of the five-minute period, timing relay 194 "times-out" to open its contacts and deenergize the relay 193. This terminates the calibrating operation, and the calibrating valve 21 is again deenergized and so returns to the position illustrated in FIG. 3. The system is then in calibration for control of the constituent potential of furnace 10 with relatively high precision.

While in the modification of FIGS. 1 and 2 the reproducible carbon content for element 11 was given as −0.05%, the value for the arrangement for the modification of FIGS. 3 and 4 has been given as a value which will be somewhat above −0.05% C. This value in the range of about −0.02% to −0.03% C takes into account the slight loss in carbon potential arising by reason of the lack of contact of element 11 with the carburizing agent in its nascent state, as in furnace 10. Though the value be slightly different, it has been found as a result of actual test that the selected value of about −0.02% C is a reproducible low value which may be utilized for calibrating purposes to provide the requisite accuracy in the carburizing of materials.

The system of FIGS. 3 and 4 includes additional features, such for example, as the provision of a carbon-removing atmosphere within the assembly 154 in the event the carbon potential of the atmosphere therein should exceed a preselected value of, for example, 1.25% C. With such high values, sooting conditions arise. Accordingly, as the carbon potential rises to about 1.25% C, a cam 205 operates a switch 206 to complete an energizing circuit for the solenoid 21a of valve 21 again to initiate flow of a mixture of dissociated ammonia and air into the assembly 154 and around and about the element 11. This circuit is completed through the normally closed *c* contacts of relay 193.

It is to be noted that calibrating operations can be initiated with the switch 206 closed. That switch 206 will open when the carbon potential on element 11 has been reduced below the sooting conditions, below about 1.25% C. However, decarburization will continue since relay 193 will be energized by momentary actuation of switch 190 as above described.

It is to be understood that the cams 199, 203 and 205 are adjustably secured on the shaft of motor 174 and each preset so that their notch portions are effective at a finite position relative to recorder pen position at approximately the respective values of −0.02% C, −0.03% C and +1.25% C. Additional adjustments are provided as by mounting each switch assembly on a disc freely journaled on the shaft to the motor and for relative adjustment with respect to the cam. Knobs 200k, 202k and 206k have been illustrated for the adjustment of the switch assemblies relative to their respective cams.

During the foregoing operations, the purge valve 152 remained in its deenergized position. It is provided so that the sampling line 158 may be purged at any time it may be suspected that air has entered into it. By closing a switch 207, the solenoid 152a is energized to complete a flow connection between line 208 and line 210 and to close the passage by way of throttling valve 58. In this manner, the suction of pump 44 is applied to the sampling line 150. Gases therein are thus withdrawn and discharged by the pump 44 through the outlet throttling valve 49. By reason of this provision, the filter 155 may be replaced and the line 150 cleaned during a time when the furnaces 10 and 151 are up to operating temperature. During such operations, the purge switch 207 of FIG. 4 will be closed, and the line subjected to the suction of pump 44 until the line shall have been returned to its normal operating conditions and purged of any air which may have entered into it. The presence of any substantial amount of air or oxygen in the atmosphere surrounding element 11 will produce oxidation thereof at the operating temperature and thus will change its resistance value.

It is to be understood that features of the modification of FIGS. 1 and 2 may be utilized in the modification of FIGS. 3 and 4, and vice versa, it being the purpose of the present disclosure to demonstrate the versatility of the invention with at least two typical embodiments thereof. All such modifications are intended to be included within the scope of the appended claims. More particularly, the assembly 154 of FIG. 3, as well as the ammonia dissociator 35, may be disposed within the heat-treating furnace 10, the operation otherwise being the same as described in connection with FIG. 3.

The gas mixture supplied to the furnace 10 to provide metal treating atmosphere by the supply pipe 54 is brought into its equilibrium or reacted state in furnace 10 and is thereafter rapidly cooled in transfer line 150. It is possible, however, to obtain directly from supply line 54, as by way of a flow line including a valve 54a, a sample of the gas mixture. For this modification there would then be utilized in the furnace 151 of FIG. 3 a vessel like vessel 14 of FIG. 1, the pipe 150 then being flow-connected to the interior of furnace 151 of FIG. 3 maintained at a temperature bearing a known relation to that of the furnace 10. Thus in furnace 151 the gas mixture would be reacted, i.e., the various constituents brought into equilibrium with each other under the conditions for which potential measurements are required. The mixture is then brought into contact with the sensitive element 11 which through opening 14b is in open communication with the atmosphere of auxiliary furnace 151. The controller shown in FIG. 3 by adjustment of the valve 168 would still be used to regulate the carbon potential of the atmosphere supplied to furnace 10.

The controller shown in FIG. 3, regulating the position of valve 168, may be utilized to control the constituent potential of the gases delivered by the gas generator 163 in still another way; that is to say, where the line from valve 168 is used to supply a constituent-bearing material directly to the gas generator 163 in order to produce from the gas generator fully reacted gases of a predetermined carbon potential for establishment of the desired carbon potential within the treating furnace 10. When this arrangement is utilized, the valve 54a may be open and the valve 150a closed to obtain a sample ahead of the furnace, or the sample may be taken from the furnace. In all other respects, such a system will be like that of FIG. 3 and will operate in the manner described.

What is claimed is:

1. In a system for measuring the constituent potential of an atmosphere having disposed therein an element an electrical characteristic of which varies with change in the concentration of the constituent within said atmosphere due to transference of the constituent to and from said element, the combination of an ammonia dissociator for dissociating ammonia into nitrogen and hydrogen, means for supplying ammonia to said dissociator, said dissociator including a housing within which said nitrogen and hydrogen are isolated from the atmosphere surrounding said dissociator, means including a flow connection to said dissociator for surrounding said element with the mixture of nitrogen and hydrogen derived from said dissociator, means for producing water vapor in said mixture for transference from said element of said constituent to reduce the constituent in that element to a reproducible minimum value, and means operable after attainment of said reproducible minimum value for terminating the flow to that element of said mixture including said water vapor.

2. The system of claim 1 in which said element is included in a balanceable electrical network, said network including a rebalancing circuit component and an adjustable calibrating circuit component, means responsive to unbalance of said network for adjusting said rebalancing component for measurement of the concentration of the constituent potential of said atmosphere, means for temporarily unbalancing said network by an amount corresponding with the unbalance present when said element has its reproducible minimum value of said constituent therein, means including said calibrating circuit component for rebalancing said network as said constituent is removed from said element by said mixture of nitrogen, hydrogen and water vapor, and means for terminating the adjustment of said calibrating circuit component after attainment of said reproducible minimum value and before rise from said minimum value.

3. The system of claim 2 in which said calibrating circuit component has a motor for operating the same and in which there are provided cyclically operated means for intermittent energization of said motor for stepwise adjustment of said calibrating circuit component, and timing means operable whenever the time between stepwise adjustments of said calibrating circuit component exceeds a predetermined value for terminating said calibrating operation.

4. The system of claim 1 in which flow control means are provided for said dissociated ammonia, and in which said means for producing water vapor includes a flow controller for adding air to said dissociated ammonia in quantity about ten percent by volume.

5. The system of claim 1 in which there is included in said flow connection a molecular sieve for removing from said mixture any ammonia not dissociated into nitrogen and hydrogen by said dissociator.

6. The system of claim 1 in which said means for surrounding said element with said mixture of nitrogen and hydrogen includes a safety valve having a venting passage for removal from the vicinity of the furnace said mixture of nitrogen and hydrogen and operable to close said venting passage for transfer of said mixture to said element.

7. In a system for measuring the constituent potential of an atmosphere having disposed therein an element an electrical characteristic of which varies with change in the concentration of the constituent within said atmosphere due to transference of the constituent to and from said element, the combination of means for surrounding said element with a constituent-removing atmosphere for transference from said element of said constituent progressively to remove the constituent from said element until there is attained in that element a reproducible minimum value of said constituent indicated by a specific value of said electrical characteristic, a balanceable measuring circuit including therein said element, calibration means including a circuit component operable upon establishment of said constituent-removing atmosphere about said element for producing unbalance of said network corresponding with said reproducible minimum value of said constituent in said element, rebalancing means responsive to the unbalance of said measuring circuit for rebalancing the same after unbalance thereof at said reproducible value, the removal of said constituent from said element unbalancing said network, said rebalancing means responding to said unbalance to rebalance said network, said unbalancing of said network with change in said constituent concentration in said element followed by said rebalancing action by said rebalancing means occurring in a cyclic manner with the time interval of said cycles increasing with decrease in said constituent concentration in said element, timing means for measuring said time interval of said cycles, and means responsive to the operation of said timing means when said time interval exceeds a preselected value indicative of the attainment by said element of said reproducible minimum value of said constituent therein for removing from said element said constituent-removing atmosphere.

8. The system of claim 7 in which said timing means for measuring said time interval of said cycles comprises an energizing circuit for initiating a timing operation for the measurement of the time interval of one of said cycles, a relay for completing said energizing circuit to initiate said timing operation, said rebalancing means including a motor energized for rotation in one direction only during transference from said element of said constituent by said constituent-removing atmosphere, and means for interrupting said energizing circuit for said timing means each time said motor is energized and for closing said energizing circuit each time said motor is deenergized.

9. In a system for measuring the constituent potential of an atmosphere having disposed therein an element an electrical charactistic of which varies with the change in the concentration of the constituent within said atmosphere due to transference of the constituent to and from said element, the combination of means for surrounding said element with a constituent-modifying atmosphere for maximum transference between said element and said atmosphere of said constituent progressively to achieve an extreme condition of the constituent content of said element until there is attained in that element a reproducible value of said constituent as indicated by a specific value of said electrical characteristic, a balanceable measuring network including therein said element, calibration means operable upon establishment of said constituent-modifying atmosphere about said element for producing unbalance of said network corresponding with said reproducible value of said constituent in said element, rebalancing means responsive to the unbalance of said measuring circuit for rebalancing the same after unbalance thereof at said reproducible value, change in said constituent content of said element unbalancing said network, said rebalancing means then responding to said unbalance again to rebalance said network, said unbalancing of said network with change in said constituent concentration in said element followed by said rebalancing action by said rebalancing means occurring in a cyclic manner with the time interval of said cycles increasing with approach of said constituent concentration in said element to said extreme value, timing means for measuring said time intervals of said cycles, and means responsive to the operation of said timing means when said time interval exceeds a value indicative of the attainment by said element of said reproducible value of said constituent therein for removing from said element said constituent-modifying atmosphere.

10. In a system for measuring the carbon potential of an atmosphere having disposed therein an element an electrical characteristic of which varies with change in the concentration of carbon within said atmosphere due to transference of carbon to and from said element, the combination of means for surrounding said element with a carbon-removing atmosphere for transference from said element of said carbon progressively to remove the carbon from said element until there is contained in that element a reproducible minimum value of carbon as indicated by a specific value of said electrical characteristic, a balanceable measuring network including therein said element, calibration means including a portion operable upon establishment of said carbon-removing atmosphere about said element for producing unbalance of said network corresponding with said reproducible minimum value of carbon in said element, rebalancing means including a portion of said calibration means responsive to the unbalance of said measuring circuit for rebalancing the same after unbalance thereof at said reproducible value, the removal of carbon from said element unbalancing said network, said rebalancing means then responding to said unbalance again to rebalance said network, said unbalancing of said network with change in the carbon concentration in said element followed by said rebalancing action by said rebalancing means occurring in a cyclic manner with the time interval of said cycles increasing with decrease in the concentration of carbon in said element, timing means for measuring said time interval of said cycles, and means responsive to the operation of said timing means when said time interval exceeds a preselected value indicative of the attainment by said element of said reproducible minimum value of carbon therein for removing from said element said carbon removing atmosphere.

11. In a system for measuring the carbon potential of an atmosphere having disposed therein an element an electrical characteristic of which varies with change in the concentration of carbon within said atmosphere due to transference of carbon to and from said element, the combination of means for surrounding said element with a decarburizing atmosphere progressively to remove carbon from said element until there is attained in that element a reproducible minimum value of carbon as indicated by a specific value of said electrical characteristic, a balanceable measuring network including therein said element, calibration means operable upon establishment of said decarburizing atmosphere about said element for producing unbalance of said network corresponding with said reproducible minimum value of carbon in said element, rebalancing means responsive to the unbalance of said measuring circuit for rebalancing the same after unbalance thereof at said reproducible value, the removal of carbon from said element unbalancing said network, said rebalancing means then responding again to said unbalance to rebalance said network, said calibration means thereafter being effective to unbalance said network by a small amount in a sense opposite from network unbalance by removal of carbon from said element, said unbalancing of said network with change in carbon concentration in said element followed by said rebalancing action by said rebalancing means and unbalancing by said calibration means followed by rebalance by said rebalancing means occurring in a cyclic manner with the time interval of said cycles increasing with decrease in the carbon concentration in said element, timing means for measuring said time interval of said cycles, and means responsive to the operation of said timing means when said time interval exceeds a value indicative of the attainment by said element of said reproducible minimum value of carbon therein for removing from said element said decarburizing atmosphere.

12. The method of maintaining a constituent-sensitive ferrous-metal element in an atmosphere comprising hydrogen, and nitrogen as an inert gas, and characterized by the absence therefrom of carburizing and nitriding agents, which comprises passing ammonia over a dissociating catalyst in a reaction zone at elevated temperature to produce dissociated ammonia, removing from the dissociated ammonia any remaining undissociated ammonia to produce dissociated ammonia of high purity and passing the resultant hydrogen and nitrogen gases from said purified dissociated ammonia to a vessel containing said ferrous-metal element and disposed within a furnace to establish within said vessel and in contact with said metal element said atmosphere to the exclusion of the atmosphere of said furnace.

13. The method of claim 12 in which said metal element and vessel are disposed within said furnace maintained at elevated temperature, the additional step of adding to said dissociated ammonia a restricted flow of air for producing carbon removal conditions in said vessel and withdrawing from said vessel the mixture of gases.

14. The method of claim 12 in which said vessel and said ferrous metal element are disposed within said furnace maintained at elevated temperature and receiving heat therefrom to maintain said ferrous metal element at the temperature of said furnace, the additional steps which comprise adding air to said dissociated ammonia in quantity but a small fraction of that of the dissociated ammonia, and continuously measuring the resistance of said ferrous metal element while said atmosphere is reducing the resistance of said element by removal of a constitutent therefrom, said constituent being removed to a reproducible minimum value to establish a reproducible minimum value of resistance for said element after establishment of said reproducible minimum value terminating the flow of said dissociated ammonia, and thereafter changing the atmosphere surrounding said element to an atmosphere corresponding with that utilized in transferring a constituent to work maintained at an elevated temperature.

15. The method of claim 14 in which the constituent potential of said last-named atmosphere for the work is maintained at a selected value in response to change in resistance of said element.

16. A system for measuring the carbon potential of the atmosphere of a carburizing furnace supplied with a carburizing agent, which comprises an auxiliary furnace, a cooling pipe interconnecting the carburizing furnace and said auxiliary furnace, heating means for said auxiliary furnace to maintain its temperature at a predetermined value within the carburizing range above about 1400° F., a heating conduit extending inwardly of said auxiliary furnace from a wall thereof, said cooling pipe being connected to said heating conduit, means for continuously withdrawing a sample of the atmosphere from said carburizing furnace for flow through said cooling pipe for rapid return of said temperature to below the drop-out temperature of the carbon within said sample stream, means for filtering said cooled sample stream while at said temperature below said drop-out temperature, the cooled stream then passing through said heating conduit for progressive and rapid elevation of its temperature to that of said auxiliary furnace, and a constituent-sensitive detecting element disposed within said heating conduit in a region at which said sample stream is heated to the temperature of said auxiliary furnace prior to contact of said sample stream with said element, and means for measuring an electrical characteristic of said detecting element in determination of the constituent potential of said carburizing furnace.

17. In a metal-treating system in which work in a treating furnace is subjected to a gaseous medium having a constituent which gives rise to a constituent potential towards the work, an auxiliary furnace, heating means for maintaining said auxiliary furnace at a predetermined temperature for development of a predetermined constituent potential for a given quantity of constituent at that temperature within an atmosphere, an elongated flow channel within said auxiliary furnace, a constituent-sensitive detecting element disposed within said flow channel, a cooling pipe interconnecting said flow channel and the interior of said treating furnace, suction means connected to said flow channel for withdrawing from said treating furnace a sample of the atmosphere therein for flow through said cooling pipe where it is rapidly cooled to below the drop-out temperature of the constituent of the atmosphere and for flow through said flow channel for rapid rise of the temperature thereof to that of said auxiliary furnace prior to contact with said detecting element, and means for measuring an electrical characteristic of said detecting element which varies with change in the constituent potential of said sample of said atmosphere as a measure of the constituent potential within said treating furnace.

18. A system for controlling the carbon potential of the atmosphere of a carburizing furnace supplied with a carbon-producing agent which comprises an auxiliary furnace, means for continuously withdrawing a sample of the atmosphere from said carburizing furnace and for passing said sample to a chamber heated by said auxiliary furnace to form the sole atmosphere within said chamber, heating means for said auxiliary furnace, means for controlling the action of said heating means for maintaining at a selected value the temperature of said auxiliary furnace, carburizing potential detecting means disposed in said chamber heated by said auxiliary furnace, measuring means including said carbon potential measuring element for determining the magnitude of an electrical quantity of said element corresponding with a predetermined carbon potential within said chamber, and means for varying the supply of carbon-producing agent to said carburizing furnace in response to variation in said electrical quantity from said predetermined value for maintaining in said carburizing furnace a carbon potential of predetermined value.

19. A system for controlling the carbon potential of a carburizing furnace which comprises an auxiliary furnace, means for continuously withdrawing a sample of the atmosphere of the furnace and for passing said sample to a chamber within and heated by said auxiliary furnace to form the sole atmosphere in said chamber, heating means for said auxiliary furnace, means responsive to the temperature of said carburizing furnace for indicating and controlling the temperature thereof, means responsive to the temperature of said auxiliary furnace for indicating and controlling its temperature to make it the same as that of said carburizing furnace, carburizing potential detecting means disposed in said chamber, measuring means including said carbon potential measuring means for predetermining the magnitude of an electrical quantity of said means corresponding with a predetermined carbon potential within said chamber, and means for varying the carbon-producing agent in said carburizing furnace in response to variation in said electrical quantity from said predetermined value for maintaining in said carburizing furnace a carbon potential of predetermined value.

20. In a metal-treating system in which work in a treating furnace is subjected to a gaseous medium having a constituent which gives rise to a constituent potential toward the work, an auxiliary furnace, a constituent-sensitive detecting element disposed within said auxiliary furnace, heating means for maintaining said auxiliary furnace at a temperature having a predetermined relation to the temperature of the metal-treating furnace which affords a predetermined relation between the constituent potential sensed by said element and the constituent potential in said treating furnace, means for concurrently and separately supplying a constituent-supplying agent to said treating furnace and into constituent-exchange relation with said element, and means for measuring an electrical characteristic of said element which varies with change in the constituent potential of the atmosphere surrounding it as a measure of the constituent potential within said treating furnace whereby the supply of said agent may be regulated in accordance with said change of said electrical characteristic of said element.

21. The system of claim 20 in which said element is in open communication to the atmosphere of said auxiliary furnace and in which said constituent-supplying agent is supplied to the interior of said auxiliary furnace.

22. The system of claim 20 in which said constituent-supplying agent comprises fully reacted gases which at the operating temperature provide said constituent potential and in which means are provided for supplying said fully reacted gases to said sensitive element disposed within said auxiliary furnace, said element in that furnace being protected from the furnace atmosphere by an enclosing housing.

23. The system of claim 20 in which the following are provided, an ammonia dissociator including a catalyst for dissociating ammonia into nitrogen and hydrogen, means for supplying ammonia to said dissociator, means for surrounding said element with the mixture of nitrogen and hydrogen derived from said dissociator for transference from said element of said constituent to reduce the constituent in that element to a reproducible minimum value, and means operable after attainment of said reproducible minimum value for terminating the flow of said dissociated ammonia to that element.

24. The system of claim 23 in which said element is included in a balanceable electrical network, said network including a rebalancing circuit component and an adjustable calibrating circuit component, means responsive to unbalance of said network for adjusting said rebalancing component for measurement of the concentration of the constituent potential of said atmosphere, means for temporarily unbalancing said network by an amount corresponding with the unbalance which would be present with said element at its reproducible minimum value of said constituent therein, means including said calibrating circuit component for rebalancing said network as said constituent is removed from said element by said mixture of nitrogen and hydrogen, and means for terminating the adjustment of said calibrating circuit component after attainment of said reproducible minimum value.

25. In a metal-treating system in which work in a metal-treating furnace is subjected to a gaseous medium having a constituent which gives rise to a constituent potential toward the work, a constituent-sensitive detecting element, structure forming a closed-end well within which said element is disposed, means for heating said well for maintaining said element at a temperature having a predetermined relation to the temperature of the metal-treating furnace to establish a predetermined relation between the constituent potential sensed by said element and the constituent potential in said metal-treating furnace, means for supplying a constituent-supplying agent directly to said metal-treating furnace and directly into constituent-exchange relation with said element in said well, means for measuring an electrical characteristic of said element which varies with change in the constituent potential of the atmosphere surrounding it as a measure of the constituent potential within said metal-treating furnace whereby the supply of said agent to both said metal-treating furnace and said well may be regulated in accordance with said change of said electrical characteristic of said element.

26. In a system for measuring the constituent potential of an atmosphere having disposed therein an element an electrical characteristic of which varies with change in the concentration of the constituent within said atmosphere due to transference of the constituent to and from said element, the combination of an ammonia dissociator including a catalyst for dissociating ammonia into nitrogen and hydrogen, means for supplying ammonia to said dissociator, a throttling valve having an inlet for the flow of air thereto, a suction pump having an inlet passage connected to said throttling valve, means including a flow connection from said ammonia dissociator to said element for surrounding said element with said mixture of nitrogen and hydrogen derived from said dissociator, a flow connection between the high-pressure side of said pump and said flow connection from said dissociator, a flow controller connected to said pump on the high-pressure side thereof for limiting the flow of air into said mixture of nitrogen and hydrogen to an amount not exceeding about ten percent thereof for producing a constituent-reducing atmosphere for said element to reduce the constituent in said element to a reproducible minimum value, said last-named means having an element operable to a first position to establish said flow of said mixture of hydrogen, nitrogen and air about said element and operable to a second position to terminate the flow of said mixture and to apply suction to a sampling line for withdrawal into contact with said element of a sample of the atmosphere whose constituent is to be measured, and means operable after attainment of said reproducible minimum value for operating said element from its said first position to its said second position, thereby to terminate the flow of said dissociated ammonia to that element and to initiate flow into contact with said element of said sample of said atmosphere whose constituent is to be measured.

27. In a system for measuring the constituent potential of an atmosphere having disposed therein an element an electrical characteristic of which varies with change in the concentration of the constituent within said atmosphere due to transference of the constituent to and from said element, the combination of a sampling line extending from the atmosphere the potential of which is to be measured to said element for providing around said element said atmosphere, a suction pump for applying suction to said sampling line for withdrawal of a sample of said atmosphere for said element, an ammonia dissociator for dissociating ammonia into nitrogen and hydrogen, means for supplying ammonia to said dissociator, means for surrounding said element with the mixture of nitrogen and hydrogen derived from said dissociator, said last-named means including a valve and a by-pass connection from said sampling line extending around said element for withdrawal of gases through said sampling line without contacting said element thereby to purge said line, means for producing water vapor in said mixture of nitrogen and hydrogen for the reduction of the constituent in said element to a reproducible minimum value, and means operable after attainment of said reproducible minimum value for terminating the flow to that element of said mixture including said water vapor.

28. The method of determining the constituent potential within a metal-treating furnace having supplied thereto a constituent which gives rise within the furnace atmosphere of a constituent potential related to the furnace temperature and to the quantity of constituent supplied thereto, which comprises withdrawing from the furnace atmosphere a sample stream, rapidly cooling the withdrawn stream to below the constituent drop-out temperature, filtering said cooled stream to remove therefrom solids and chemical components unrelated to said constituent, indirectly heating said sample stream to raise its temperature to a value which gives rise to a predetermined constituent potential bearing a predetermined relation to the constituent potential of said sample stream prior to withdrawal from said atmosphere, after elevation to said predetermined temperature directing said sample stream into intimate constituent-transferring contact with a measuring means an electrical characteristic of which varies with the constituent-content of said measuring means, transferring said constituent from and to said measuring means in direction dependent upon the relative magnitudes of said constituent within said measuring means and in said sample stream to bring the constituent concentration in said measuring means into equilibrium with the constituent content of said sample stream at its predetermined temperature, and measuring the magnitude of said electrical characteristic to determine the constituent potential at said predetermined temperature for obtaining a measurement related to the constituent potential within said metal-treating furnace.

References Cited in the file of this patent
UNITED STATES PATENTS

| 1,770,059 | Barber | July 8, 1930 |
| 2,541,857 | Besselman et al. | Feb. 13, 1951 |
| 2,698,222 | Davis | Dec. 28, 1954 |

UNITED STATES PATENT OFFICE
CERTIFICATE OF CORRECTION

Patent No. 3,011,873 December 5, 1961

Raymond L. Davis II

It is hereby certified that error appears in the above numbered patent requiring correction and that the said Letters Patent should read as corrected below.

Column 4, line 13, for "ammoina" read -- ammonia --; column 8, line 42, for "normaly" read -- normally --; column 20, line 2, after "volume" insert -- of said dissociated ammonia --; column 24, line 70, for "means for heating" read -- heating means for --.

Signed and sealed this 24th day of July 1962.

(SEAL)
Attest:

ERNEST W. SWIDER
Attesting Officer

DAVID L. LADD
Commissioner of Patents